(12) United States Patent
Cotoras Tadic et al.

(10) Patent No.: US 7,326,344 B2
(45) Date of Patent: Feb. 5, 2008

(54) PROCESS FOR THE REMOVAL OF METALS BY BIOSORPTION FROM MINING OR INDUSTRIAL EFFLUENTS

(75) Inventors: Davor Cotoras Tadic, Santiago (CL); Fernando Valenzuela Lozano, Santiago (CL); Miguel Esteban Zarzar Maza, Santiago (CL); Pabla Leticia Viedma Elicer, Santiago (CL)

(73) Assignees: Universidad de Chile (CL); Biotechnologias del Agua Ltda. (CL)

( * ) Notice: Subject to any disclaimer, the term of this patent is extended or adjusted under 35 U.S.C. 154(b) by 183 days.

(21) Appl. No.: 11/242,075

(22) Filed: Oct. 4, 2005

(65) Prior Publication Data

US 2006/0070949 A1    Apr. 6, 2006

(30) Foreign Application Priority Data

Oct. 6, 2004 (CL) ................................ 2581-2004
Aug. 2, 2005 (CL) ................................ 1945-2005

(51) Int. Cl.
*C02F 3/00* (2006.01)
(52) U.S. Cl. ...................... 210/615; 210/616; 210/617; 210/620; 210/621; 210/631; 210/639
(58) Field of Classification Search ................ 210/602, 210/631, 764, 639, 615, 616, 617, 620–622
See application file for complete search history.

(56) References Cited

U.S. PATENT DOCUMENTS 4,769,223 A    9/1988 Volesky et al.
4,898,827 A    2/1990 Brierley et al.

(Continued)

OTHER PUBLICATIONS

Bedell et al., Immobilization Of Nonviable, Biosorbent, Algae Biomass For The Recovery Of Metal Ions, pp. 314-325, dated 1990.

(Continued)

*Primary Examiner*—Chester T. Barry
(74) *Attorney, Agent, or Firm*—Banner & Witcoff, Ltd.

(57) ABSTRACT

A method and a plant to remove metals by biosorption from mining or industrial effluents comprising: (a) subject the effluent to at least one first stage of pre-treatment, selecting among: precipitation by pH rising, solvent extraction or solvent extraction on emulsified membranes in order to reduce its load of metals to a concentration level that allows it to be treated by the next stage of biosorption, and (b) subject the liquid that has been previously in the stage of pre-treatment to a second stage of continuous metals removal by biosorption. To perform the continuous metals removal by biosorption is supplied a group of reactors, constituted for at least one, or at least two or at least three fixed bed bioreactors, which packing material has been colonized with a biofilm formed by a bacterial culture or a mixture of microorganisms with the capacity of binding metals by biosorption; pre-treated water is led to the group of bioreactors, the treated effluent comes from this last one and is led to the discharge of the plant.

27 Claims, 4 Drawing Sheets

U.S. PATENT DOCUMENTS

| | | | |
|---|---|---|---|
| 5,055,402 A | | 10/1991 | Greene et al. |
| 5,279,745 A | | 1/1994 | Jeffers et al. |
| 5,538,645 A | | 7/1996 | Yannai et al. |
| 5,602,071 A | | 2/1997 | Summers, Jr. et al. |
| 5,648,313 A | | 7/1997 | Pohl |
| 5,789,204 A | | 8/1998 | Kogtev et al. |
| 5,976,847 A | | 11/1999 | Hermann |
| 6,013,511 A | | 1/2000 | Diels et al. |
| 6,027,543 A | * | 2/2000 | Yoshizaki et al. ............. 71/11 |

OTHER PUBLICATIONS

Blais et al., State of the art of technologies for metal removal from industrial effluents. Rev. Des Sciences De L'Eau, vol. 12 (4): pp. 687-711, dated Dec. 4, 1999.

Castro et al., Biomasa de Rhizopul oligosporus como adsorbente de iones metalicos, Microbiologia SEM 8, pp. 94-105, dated 1992.

Cotoras et al, Biosorption of metal ions by *Azotobactor vinelandii*, World Journal of Applied Microbiology and Biotechnology, vol. 8, pp. 319-323, dated 1992.

Cotoras et al., Sorption of Metal Ions By Whole Cells of Bacillus and Micrococcus, Environmental Technology, vol. 13, pp. 551-559, dated 1992.

Eccles, Treatment of metal-contaminated wastes: why select a biological process? Trends Biotechnol., vol. 17, pp. 462-465, dated 1998.

Figueira, et al. Biosorption of Metals in Brown Seaweed Biomass, Wat. Res., vol. 34, No. 1, pp. 196-204, dated 2000.

Gadd et al., Microbial Treatment of Metal Pollution—A Working Biotechnology? Trends in Biotechnology., vol. 11, Issue 8, pp. 353-359, dated 1993, (Abstract Only).

Gilson et al., Calcium alginate bead manufacture: With and without immobilized yeast. Drop formation at a two-fluid nozzle, Journal of Chemical Technology & Biotechnology, vol. 62, Issue 3, pp. 227-232, dated 1995 (Abstract Only).

Kapoor et al., Fungal biosorption—an alternative treatment option for heavy metal bearing wastewaters: a review, Bioresource Technology, vol. 53, Issue 3, pp. 195-206, dated 1995 (Abstract Only).

Kratochvil et al., Advances in the biosorption of heavy metals, Trends iotechnol., vol. 16, , pp. 291-300, dated 1998.

Kratochvil et al., Multicomponent Biosorption In Fixed Beds, Wat. Res., vol. 34, No. 12, pp. 3186-3196, dated 2000.

Kratochvil, et al., Optimizing Cu Removal/Recovery In A biosorption Column, Wat. Res., vol. 31, No. 9, pp. 2327-2339, dated 1997.

Tsezos et al., An Investigation of Engineering Parametes for the Use of Immobilized Biomass Particles in Biosorption, J. Chem. Tech., Biotechnol., vol. 48, pp. 29-39, dated 1990.

Volesky, Detoxification of metal-bearing effluents: biosorption for the next century, Hydrometallurgy, vol. 59, Issues 2-3, pp. 203-216, dated Feb. 2001 (Abstract and Article Outline Only).

Volesky et al., Biosorption of Heavy Metals, Biotechnol. Prog., vol. 11, pp. 235-250, dated 1995.

White, et al., The role of microorganisms in biosprption of toxic metals and radionuclides, International Biodeterioration & Biodegradation, vol. 35, Issues 1-3, pp. 17-40, dated 1995 (Abstract Only).

* cited by examiner

PROCESS FOR THE REMOVAL OF METALS BY BIOSORPTION FROM MINING OR INDUSTRIAL EFFLUENTS

FIELD OF THE INVENTION

This invention relates to a process and a bioremediation plant, employed to biologically remove heavy metals by attached microorganisms.

TABLE 1

Performance characteristics of some metal removal and recovery technologies (modified from Eccles (1998) Treatment of metal-contaminated wastes: why select a biological process? Trends Biotechnol. 17, pp. 462-465.)

| Technology | pH Change | Metals Selectivity | Suspended Solids Influence | Tolerance to Organic Molecules | Appropriated Work Level for Metal (mg/L) |
|---|---|---|---|---|---|
| Hydroxide Precipitation | Tolerant | Non-Selective | Tolerant | Tolerant | >10 |
| Sulfide Precipitation | Limited Tolerance | Limited Selectivity (according to pH) | Tolerant | Tolerant | >10 |
| Adsorption | Limited tolerance | Moderated | Gets fouled | Can suffer poisoning | <10 |
| Electrochemical | Tolerant | Moderated | Can be handled to become tolerant | Can be adjusted | >10 |
| Microfiltration | Limited | Moderated | Gets fouled | Non-Tolerant | >10 |
| Ion exchange | Limited Tolerance | The coordinating resins can be selective | Gets fouled | Can get poisonous | <100 |
| Solvent extraction | Tolerance in some systems | There are selective extractants for metals | Gets fouled | Non-Tolerant | >100 |
| Biosorption** | Limited Tolerance | Moderated | Gets fouled | Tolerant | <10 |

**added to comparison

BACKGROUND OF THE INVENTION

Traditionally, physical-chemical methods have been used to remove metals from industrial and mining effluents, being the precipitation by rising the pH of the solution the simplest method to perform this operation. However, the permitted levels for metals discharge to surface and underground water bodies are, in some cases, lower to those that can be achieved by this system. For this reason, other additional alternatives for the metals removal have been studied.

In an interesting recent review, Blais et al. (2000). State of the art of technologies for metal removal from industrial effluents. Rev. Sci. Eau 12 (4): 687-711, described in detail the state of development of each of them. Among the metals removal and recovering processes are: precipitation, absorption and biosorption, electro-winning and electrocoagulation, cementation, membrane separation (reverse osmosis and electrodialysis), solvent extraction and ion exchange.

In Table 1 are shown the performance characteristics of these technologies. This information clearly proves that efficiency depends on the tolerance degree of the technologies to the conditions of the effluent and on the required levels of treatment. In this sense, as we will see later, biosorption is a technology that makes possible the removal of metals in order to reach low levels of pollution. Thus, the choice of a suitable pollution control technology depends on several factors, such as:

discharge fate
metal type and its concentration
other contaminants in the water
decontamination level required
treatment costs As the environmental restrictions have become more rigorous and the discharge limits of emission have dropped, more environmentally friendly metal production processes are required.

STATE OF THE ART

Biosorption is understood as the uptaking of heavy metals by a part of the biomass (living or nonliving) only by physical-chemical mechanisms. In general terms, the biosorption process has been described as a non-selective mechanism that allows the removal of the following metals: Ag, Al, Au, Co, Cd, Cu, Cr, Fe, Hg, Mn, Ni, Pb, Pd, Pt, U, Th, Zn, and others (Gadd y White (1993). Microbial Treatment of Metal Pollution—A Working Biotechnology? Trends Biotechnol., 11, 353-359).

Nowadays, there is a large amount of international scientific literature about the capability of some microorganisms of concentrating metal ions by biosorption from dilute solutions, among them we can mention Castro et al. (1992), Biomasa de *Rhizopus oligosporus* como adsorbente de iones metálicos. Microbiologia SEM 8, 94-105, Cotoras et al. (1992) Biosorption of metal ions by *Azotobacter vinelandii*. World Journal of Applied Microbiology and Biotechnology 8, 319-323, Cotoras et al. (1992) Sorption of metal ions by whole cells of *Bacillus* and *Micrococcus* Environmental Technology 13, 551-559, Fourest y Roux (1992), Heavy metal biosorption by fungal mycelial by-products: mechanism and influence of pH. Appl. Microbiol. Biotechnol. 37 pp. 399-403, Holan y Volesky (1995), Accumulation of cadmium, lead and nickel by fungal and wood biosorbents. Appl. Biochem. Biotechnol. 53 pp. 133-142. The research works have covered different groups of organisms, among which are: bacteria (e.g. *E. coli, Zoogloea ramigera, Bacillus subtilis, Azotobacter vinelandii*, etc.), fungi (e.g. *Rhizopus arrhizus, Aspergillus niger*) and alga (e.g. *Chlorella vulgaris, Sargassum* sp.). From all of these researches it is possible to conclude that microorganisms can concentrate important amounts of metal ions. Values of biosorption from 0.3% to 35% of the microbial dry weight when using solutions with metals concentration between 10 and 100 mg/L have been published. In some cases, metal removal from the solution overcomes the 99% of efficacy (Gadd y White (1993). Microbial Treatment of Metal Pollution—A Working Biotechnology? Trends Biotechnol., 11, 353-359).

Researches about the application of biosorption in the removal of metals from industrial effluents.

Besides the purely scientific studies about this matter, biosorption has also been studied as an economical system for metal removal from industrial effluents by means of living biomass, nonliving biomass or its derivatives. There are numerous reviews about the state of development of the biosorption application and its advances. Among them are: Kratochvil D. y B. Volesky, Advances in the biosorption of heavy metals, Trends Biotechnol. 16 (1998), pp. 291-300; Volesky B. y Z. R. Holan, Biosorption of heavy metals, Biotechnol. Prog. 11 (1995), pp. 235-250; Kapoor, A. y Viraraghavan, T. (1995), Fungal Biosorption—An Alternative Treatment Option for Heavy Metal Bearing Wastewaters: A Review. Bioresource Technology, 53, 195-206; y White, C et al. (1995), The Role of Microorganisms in Biosorption of Toxic Metals and Radionuclides. International Biodeterioration & Biodegradation, 17-40. This background information have been summarized in the review article by Volesky, Detoxification of metal-bearing effluents: bisorption for the next century Hydrometallurgy Volume 59, 203-216 (2001).

One of the most relevant requirements for the technological application of biosorption is the biomass fixation to an attaching medium in order to allow the biosorbent to be kept in a reactor, so it can be reused. This have been performed frequently by immobilizing the microorganisms on a matrix.

There are many examples of the application of these methodologies, the most representative can be found in the following scientific researches: Brierley, Production and application of a *Bacillus*-based product for use in metals biosorption. In: B. Volesky, Editor, Biosorption of Heavy Metals, CRC Press, Boca Raton, Fla. (1990), pp. 305-312; Brierley y Brierley, Immobilization of biomass for industrial application of biosorption. In: A. E. Torma, M. L. Apel and C. L. Brierley, Editors, Biohydrometallurgical Technologies, Proceedings of the International Biohydrometallurgy Symposium, The Minerals, Metals and Materials Society, Warrendale, Pa. (1993), pp. 35-44; Tsezos y Deutschmann (1990). An Investigation of Engineering Parameters for the use of Immobilized Biomass Particles in Biosorption. J. Chem. Technol. Biotechnol., 48, 29-39; Gilson y Thomas (1995), Calcium alginate bead manufacture: with and without immobilised yeast. Drop formation at a two-fluid nozzle. J. Chem. Technol. Biotechnol. 62 pp. 227-232; Bedell y Darnall, (1990), Immobilization of nonviable, biosorbent, algal biomass for the recovery of metal ions. In: B. Volesky, Editor, Biosorption of Heavy Metals, CRC Press, Boca Raton, Fla., pp. 313-326; Figueira et al. (2000), Biosorption of metals in brown seaweed biomass. Water Res. 34 pp. 196-204; Kratochvil et al. (1997) Optimizing Cu removal/recovery in a biosorption column. Water Res. 31 pp. 2327-2339; Kratochvil y Volesky, (2000), Multicomponent biosorption in fixed beds. Water Res. 34 pp. 3186-3196; Trujillo et al, (1991), Mathematically modeling the removal of heavy metals from wastewater using immobilized biomass. Environ. Sci. Technol. 25 pp. 1559-1565.

Among all these studies on immobilization are the remarkable works by the Brierley couple (Brierley, Production and application of a *Bacillus*-based product for use in metals biosorption. In: B. Volesky, Editor, Biosorption of Heavy Metals, CRC Press, Boca Raton, Fla. (1990), pp. 305-312; Brierley y Brierley, Immobilization of biomass for industrial application of biosorption. In: A. E. Torma, M. L. Apel and C. L. Brierley, Editors, Biohydrometallurgical Technologies, Proceedings of the International Biohydrometallurgy Symposium, The Minerals, Metals and Materials Society, Warrendale, Pa. (1993), pp. 35-44), who created an immobilized biosorbent product based on a bacterium (*Bacillus subtilis*). The microalgae immobilization of the Darnall's research group (Bedell y Darnall, (1990), Immobilization of nonviable, biosorbent, algal biomass for the recovery of metal ions. In: B. Volesky, Editor, Biosorption of Heavy Metals, CRC Press, Boca Raton, Fla., pp. 313-326), the immobilized brown seaweed of the Volesky's group (Figueira et al. (2000), Biosorption of metals in brown seaweed biomass. Water Res. 34 pp. 196-204; Kratochvil et al. (1997) Optimizing Cu removal/recovery in a biosorption column. Water Res. 31 pp. 2327-2339; Kratochvil y Volesky, (2000)) and the Jeffers's pellet-shaped product named BIO-FIX (Trujillo et al, (1991), Mathematically modeling the removal of heavy metals from wastewater using immobilized biomass. Environ. Sci. Technol. 25 pp. 1559-1565.) The immobilizing agents or the most commonly used matrixes are alginate, polyacrylamine, polysulfone, silica, cellulose and glutaraldehyde.

The development of biosorbent materials has also led to the obtainment of a large amount of patents related to this subject. Thus, Volesky, et al., (1988) patented a method for gold biosorption using the biomass of a brown seaweed attached by a natural or synthetic polymer (U.S. Pat. No. 4,769,223). In the 90's decade, the greatest part of the patents followed this example, promoting the production of pellets-shaped biosorbents by the artificial uptaking or immobilization of the biomass. This focus is also applied by the following patents: Brierley, et al. (1990, U.S. Pat. No. 4,898,827) they use immobilized *Bacillus subtilis* with the metal binding capacity of this bacterium, Greene, et al. (1991, U.S. Pat. No. 5,055,402) they used immobilized microalgae at high levels of temperature (300° C. to 500° C.). It is also important to state the development of polymer beads, such as polysulfone to immobilize sorbents (Jeffers, et al., 1994, U.S. Pat. No. 5,279,745) which constitutes the base for BIO-FIX, developed by the Bureau of Mines of the United States. More recently, the following processes of preparation of biosorbents have been published: crosslinked yeasts by aldehydes (Yannai, et al. 1996, U.S. Pat. No. 5,538,645) biological material beads immobilized by neutralized and crosslinked poli-(acid carboxylics) adhesives (Summers, Jr., et al. 1997, U.S. Pat. No. 5,602,071), brown seaweed which alginate has been extracted (Pohl 1997, U.S. Pat. No. 5,648,313), fungal biomass (of the types of *Aspergillus, Penicillium* and *Trichoderma*) o bacterial (*Micrococcus*) treated with phosphoric acid, solvents and sodium hydroxide (Kogtev, et al. 1998 U.S. Pat. No. 5,789, 204), microorganisms immobilized in hydrophilic polyurethane (Hermann 1999, U.S. Pat. No. 5,976,847).

Although these biosorbent materials are promising, they show the following disadvantages:

They need a biomass concentration stage (e.g. centrifugation) mixed with the immobilizing agent and subsequent reaction of gelling.

They use chemical agents potentially hazardous and/or expensive (e.g. dimethylformamide (DMF) used during the production process of BIO-FIX).

On the other hand, Diels, et al. (2000, U.S. Pat. No. 6,013,511) described metals bioprecipitation by using biofilms formed in a side of very singular membranes, made of an inorganic oxide and an organic polymer. Nevertheless, this process requires the constant addition of nutrients on the other side of the membrane to keep the microorganisms alive.

Cotoras and Viedma (2000, Chilean Patent Register 40704) published a process in which, first of all, a biofilm is formed spontaneously on an inert support and low-priced material. Once the immobilization is finished, the alternated cycles of biosorption and desorption start. Particularly, this is about a process to remove or recover metal ions by biosorption from industrial or mining effluents that includes the following stages: a) growing and immobilization of the biomass in the bioreactor, b) transfer the solution with metal ions, and c) elute the metal ions uptaken by the bacterial biomass. This process presents the following advantages that make it more attractive for an industrial application:

It does not require complex stages of production because the natural attachment capacity of the bacteria is employed.

It does not require the use of chemical agents, which are potentially hazardous and/or too expensive.

It uses different raw materials and supplies available at a local scale, depending on the area in which the technology is applied.

In spite of the many advantages of the biosorption process in comparison to the alternative physical-chemical methods, there are some obstacles that make it difficult to apply this process for the removal of metal ions from industrial or mining effluents. One of these difficulties is the fast metal-saturation produced when treating liquid or industrial residues containing relatively high concentrations of metals (e.g., 50 to 100 mg/L of copper). On the other hand, it arises the problem that when saturation of the biomass is produced, the process must be interrupted and a desorption operation along with a subsequent wash must be performed, in order to regenerate the metal removal capacity of the biosorbent material. This is an important disadvantage that restrains a continuous type of treatment like the industry and mining need to decontaminate their effluents.

This invention presents a series of alternatives to the disadvantages of the technologies available in the state of the technique, by the design of a process and a plant that allows the operation of the system in a diverse range of metals concentration to be treated, included effluents with high metals concentration and the continuous functioning of both the process and the plant. This is achieved by a pre-treatment stage that adjusts the levels of metal concentration and/or pH to the requirements of the biosorption stage. The result of the combination of these stages has the singularity of being synergical, because it not only overcomes the problem of the fast saturation of the microbial biomass due to the high metals concentration, but also it surpasses the obstacle of the physical-chemical systems of metals removal. The pre-treatment system is also employed to eliminate the concentrated metals generated during the desorption of the biosorption stage. The continuous operation of the whole process and the plant, in its preferred embodiment, is reached by using a group of bioreactors of biosorption that are alternated, according to its level of metal-saturation.

SUMMARY OF THE INVENTION

The main object of this invention is a method for the removal of metals by biosorption from mining or industrial effluents which comprises:

(a) subjecting the effluent to, at least, one first stage of pre-treatment, selecting among: precipitation by pH rising, solvent extraction or solvent extraction on emulsified liquid membranes, to reduce its load of metals to concentrations that can be treated in the next stage of biosorption; and (b) subjecting the liquid that has been previously treated at the pre-treatment stage to a second stage of continuous removal of metals by biosorption, in which microbial biomass is grown and immobilized in a bioreactor, towards which the water to be treated is led and, finally, the metal ions uptaken by the biomass are eluted.

In a preferred embodiment of this invention the stage of metals continuous removal by biosorption comprises:

(b1) providing of at least one fixed bed bioreactor, which packing material can be colonized with a biofilm, formed by a microbial culture or a mixture of microorganisms with the metal binding by biosorption capacity;

(b2) always perform the colonization of the packing material of said at least one bioreactor by using microorganisms when starting the functioning of the treatment method; said colonization is carried out by adding culture medium to the bioreactor, inoculating it with the attaching microorganism and subjecting the culture to aeration, agitation and temperature control for the suitable period of time to obtain the effective colonization of the support material of said at least one bioreactor, once the culture is finished, the culture medium is taken away and said at least one bioreactor is ready to be used in the biosorption stage;

(b3) leading the pre-treated water to said at least one bioreactor from which the treated effluent is obtained and led to the discharge of the plant;

(b4) when the biosorption capacity of said at least one bioreactor gets saturated, subjecting said at least one bioreactor to a desorption and neutralization treatment to regenerate the biosorption capacity of the biofilm attached to the support material of said at least one bioreactor, said desorption is performed by adding a solution with a desorbent agent, as an acid solution, with the capability of displace the metals bound to the microorganisms, obtaining an acid solution loaded with metal ions, which is reused in a new desorption process or is led to the beginning of the process, mixing it with the effluent entering to the pre-treatment;

(b5) performing, finally, the neutralization of said at least one bioreactor, adding a base solution to set the pH value close to the neutral point, in order to improve the biosorption capacity; and (b6) performing the recolonization of the fixed bed using microorganisms to replace the microbial film when, after many cycles of biosorption, desorption and neutralization, the metal removal capacity begins to diminish, said colonization is performed by adding culture medium to said at least one bioreactor, inoculating it with the attaching microorganism and subjecting the culture to aeration, agitation and temperature control for a suitable period of time to obtain the effective colonization of the support material of said at least one bioreactor, once the culture is finished the culture medium is taken away and said at least one bioreactor is ready for being employed again in the biosorption stage.

In a second preferred embodiment of this invention, the continuous metals removal by biosorption stage comprises:
(b1) providing of at least two fixed bed bioreactors, which packing material can be colonized with a biofilm formed by a microbial culture or a mixture of microorganisms with the metal binding by biosorption capability;
(b2) always perform the colonization of the packing material of said at least two bioreactors using microorganisms when starting the functioning of the treatment method, said colonization is performed by adding culture medium to said at least two bioreactors, inoculating them with the attaching microorganism and subjecting the culture to aeration, agitation and temperature control for a suitable period of time to obtain the effective colonization of the support material of said at least two bioreactors, once the culture is finished, the culture medium is taken away and said at least two bioreactors are ready to be employed in the biosorption stage;
(b3) leading the pre-treated water to a first bioreactor of one of said at least two bioreactors from which one the treated effluent is obtained and led to the discharge of the plant; meanwhile, a second bioreactor from one of said at least two bioreactors that presents full biosorption capacity is kept;
(b4) when the biosorption capacity of said first bioreactor gets saturated, leading the pre-treated water to said second bioreactor that was kept, now from this last one the treated effluent is obtained and lead to the discharge of the plant;
(b5) subjecting said first bioreactor, meanwhile and simultaneously, to a treatment of desorption and neutralization, to regenerate the biosorption capacity of the biofilm attached to the support material of said first bioreactor, said desorption is performed by adding a solution with a desorbent agent, just like an acid solution, that can displace the metals bound to the microorganisms, obtaining an acid solution loaded with metal ions, which is reused in a new process of desorption or is lead to the beginning of the process, mixing it with the effluent entering to the pre-treatment;
(b6) performing, finally, the neutralization of said first bioreactor, adding a base solution that allows to set the pH value close to the neutral point, in order to improve the biosorption capacity; and
(b7) repeating from the previous stage b4, performing a rotation of said at least two bioreactors when that one of said at least two bioreactors that receives the pre-treated effluent gets saturated again, and wherein said that one of said at least two bioreactors can be said first bioreactor or said second bioreactor; and
(b8) performing the recolonization of the fixed bed using microorganisms to replace the microbial film when, after many biosorption, desorption and neutralization cycles, its metal removing capacity begins to diminish, in this case, the recolonization of the fixed bed is performed in said first or second bioreactor that has finished the biosorption and neutralization phase, where said colonization is produced by adding culture medium to said first or second bioreactor, inoculating it with the attaching microorganism and subjecting the culture to aeration, agitation and temperature control for a suitable period of time to obtain an effective colonization of the support material of said first or second bioreactor, once the culture is finished, the culture medium is taken away and said first or second bioreactor is ready to be used again in the biosorption stage.

In a third preferred embodiment of this invention, the continuous metal removing by biosorption stage comprehends:
(b1) providing of at least three fixed bed bioreactors, which packing material can be colonized with a biofilm formed by a microbial culture or a mixture of microorganism with the capability of binding metals by biosorption;
(b2) always performing the colonization of the packing material of said at least three bioreactors using microorganisms when starting the functioning of the treatment method, said colonization is produced by adding culture medium to said at least three bioreactors, inoculating them with the attaching microorganism and subjecting the culture to aeration, agitation and temperature control for a suitable period of time to obtain the effective colonization of the support material of said at least three bioreactors, once the culture is finished, the culture medium is taken away and said at least three bioreactors are ready to be used in the biosorption stage;
(b3) leading the pre-treated water to a first bioreactor of said at least three bioreactors and from this one to a second bioreactor of said at least three bioreactors, connected in series, from this last one the treated effluent is obtained, and led to the discharge of the plant; meanwhile, a third bioreactor of said at least three bioreactors, that presents a full biosorption capacity is kept;
(b4) leading the pre-treated water to said second bioreactor when the biosorption capacity of said first bioreactor gets saturated and from this one to said third bioreactor, connected in series, that was kept, now from this last one is obtained the treated effluent that is led to the discharge of the plant;
(b5) subjecting said first bioreactor, meanwhile and simultaneously, to a desorption and neutralization treatment, in order to regenerate the biosorption capacity of the biofilm that is attached to the support material of said first bioreactor, said desorption is performed by adding a solution with a desorbent agent, just like an acid solution, that can displace the metals bound to the microorganisms, obtaining an acid solution loaded with metal ions, and which is reused in a new desorption process or is led to the beginning of the process, mixing it with the effluent entering to the pre-treatment;
(b6) performing, finally, the neutralization of said first bioreactor, adding a base solution to set the pH value close to the neutral point in order to improve its biosorption capacity;
(b7) repeating from previous stage b4 performing a rotation of the bioreactors when that one reactor, from said at least three bioreactors that receives the pre-treated effluent, gets saturated again, wherein that one bioreactor of said at least three bioreactors can be said first, second or third bioreactor; and
(b8) performing the recolonization of the fixed bed by microorganisms to replace the microbial film when, after many biosorption, desorption and neutralization cycles, its metal removing capacity begins to diminish; in this case, the recolonization of the fixed bed is performed in the same bioreactor that has finished the biosorption and neutralization stage; said colonization is performed by adding culture medium to said bioreactor; the said colonization is performed by adding culture medium to said bioreactor, inoculating it with the attaching microorganism and subjecting the culture to aeration, agitation and temperature control for a suitable period of time to obtain an effective colonization of the support material of said bioreactor, once the culture is finished the culture medium is taken away and said bioreactor is ready to be used again in the biosorption stage.

In a foreseen version of the invention, the microbial culture is a bacterial or archaeal culture. In particular, the culture of bacteria contains a population of selected bacteria among the genus *Bacillus, Pseudomonas, Klebsiella* or *Enterobacter*. In another foreseen version of the invention, the mixture of microorganisms is a community of natural microorganisms that form a biofilm isolated from the environment.

In a preferred embodiment of this invention, the bioreactor is a fixed bed aerated column, a fluidized bed reactor or a trickling filter. In a foreseen version of the invention, the agitation of the culture medium in the bioreactor is performed by recycling the culture medium with a pump. In another foreseen version of the invention, the temperature control is performed by a temperature exchanger.

In a preferred embodiment of this invention, the desorbent agent employed to remove the metals from the attached biofilm and recover the biosorption capability of the microorganisms, can be: sulfuric acid, hydrochloric acid, phosphoric acid or citric acid.

In an alternative embodiment of this invention, the colonization of the fixed bed by microorganisms is performed alternately and previously in an additional bioreactor that is in a different place from the plant, to pack the colonized fixed bed in the biosorption bioreactor when starting the functioning of the treatment plant or to replace the microbial film when, after many biosorption, desorption and neutralization cycles, its metal removal capacity begins to diminish.

In a preferred embodiment of this invention, the first stage of precipitation by pH rising pre-treatment comprises:

letting the effluent loaded with metals in a neutralization tank, with stirrer, to which a sodium hydroxide solution is added, according to the particular requirements of the industrial liquid waste to be treated;

once neutralized, leading the flow to a settling tank to accumulate the settling compounds to be eliminated subsequently;

leading the supernatant into a feed tank to pass it subsequently to the bioreactors, where the biosorption process is performed; and incorporating, at the beginning of the process, the solution loaded with metals from the subsequent stage of desorption of the bioreactors, at the neutralization reactor.

In an additional embodiment, the settling compounds generated in this pre-treatment are subjected also to dewatering by a mechanical system, just like a press-filter or a centrifuge.

In another preferred embodiment, the first stage of pre-treatment by solvent extraction comprehends:

contacting in a mixer-settler tank the organic phase constituted by a diluted extractant in an apolar diluent with the effluent to be treated;

agitating properly the resulting mix;

after a settling stage, obtaining the raffinate, corresponding to an aqueous, low metal concentrated solution and an organic, loaded with metals solution;

letting the raffinate solution pass directly to the final process of biosorption;

meanwhile and simultaneously, contacting the organic solution containing the metals in a second mixer-settler tank with a hard acid solution (stripping solution);

after agitation and settling, concentrating the metals in the strip liquor and regenerate the organic phase which is recycled to the initial mixer-settler tank; and incorporating the solution loaded with metals from the subsequent stage of desorption of the bioreactors by a conduit at the inlet of the liquid industrial waste to the process.

In another preferred embodiment, the first stage of pre-treatment by solvent extraction on emulsified liquid membranes comprehends:

preparing in a tank of the first emulsion, agitating energetically the stripping solution along with the organic phase, constituted by an extractant and tensoactive diluted in a diluent;

contacting in a mixer-settler tank, the first emulsion with the effluent to be treated, performing moderated agitation, which originates a double emulsion;

settling the three-phased system, after contacting the double emulsion to separate the first emulsion loaded with raffinate metals, which pass to the biosorption stage;

performing, besides, in the tank the breakdown of the emulsion, to finally obtain the strip liquor and an organic solution that is recycled to the tank to prepare the first emulsion; and incorporating the solution loaded with metals from the subsequent stage of desorption of the bioreactors by a conduit at the inlet of the liquid industrial waste to the process.

Particularly, the surfactant o tensoactive is sorbitan monooleate. Thus, the diluent is selected from the group constituted by aviation kerosene, n-heptane y n-hexane and the extractant is selected from the group constituted by 5-dodecylsalicylaldoxime and 2-ethylhexylphosphonic acid-mono-2-ethyl hexyl ester.

In another foreseen version of the present invention, the method also comprehends, between precipitation by pH rising and biosorption, a chitosan binding stage. In a preferred embodiment of the present invention, the chitosan binding stage comprehends:

providing of at least two columns filled with chitosan;

leading the pre-treated water with a pH higher than 3, essential for the process based on chitosan adsorption, to a first column of said at least two columns and from said first column the solution to be led to one of the bioreactors of biosorption is obtained; meanwhile a second column of said at least two columns, with a full adsorption capacity, is kept;

when the adsorption capacity of said first column gets saturated, the pre-treated water must be led to said second column of said at least two columns, that were kept, now from said second column the solution to be led to one of the bioreactors of biosorption is obtained;

subjecting said first column, meanwhile and simultaneously, to a treatment of desorption and neutralization to regenerate the chitosan adsorption capacity, said desorption is performed by adding a solution with a desorbent agent, as an acid solution, obtaining an acid solution loaded with metal ions, which is led to the beginning of the process, mixing it with the effluent entering to the pre-treatment;

performing, finally, the neutralization of said first column, adding a base solution to set the pH value close to the neutral point in order to improve its adsorption capacity; and repeating the previous procedure, performing a rotation of said at least two columns when that one of said at least two columns, that receives the pre-treated effluent, gets saturated again, in which said that one of said at least two columns can be said first column or said second column.

A second main object of the invention is a plant for the metals removal by biosorption from mining or industrial effluents that comprehends, at least:

an inlet for the intake of the liquid industrial waste or mine drainage and inlet to the pre-treatment system;

a pre-treatment system to reduce the metals load from a liquid industrial waste or mine drainage to concentrations that can be treated by the following biosorption system, selecting among precipitation by pH rising, solvent extraction or solvent extraction on emulsified membranes;

a conduit to lead the water of the biosorption system;

a biosorption system;

a conduit to lead the desorption solution of the biosorption system to the inlet for the intaking of the liquid industrial waste or mine drainage and the entering to the pre-treatment system; and a conduit for the discharge of the water treated by the biosorption system In a preferred embodiment of this invention, the plant for the removal of metals comprehends:

a group of bioreactors, constituted by, at least, one fixed bed bioreactor, which packing material has been colonized with a biofilm formed by a microbial culture or a mixture of microorganisms with the capacity of binding metals by biosorption;

an acid mixer tank connected to the bioreactor to add the acid as a desorption agent; and a base mixer tank connected to said at least one bioreactor to add a base solution that permits the residual acid to be neutralized after desorption.

In other preferred embodiment of this invention, the plant for the removal of metals comprehends:

a group of bioreactors, constituted by at least two fixed bed bioreactors, which packing material has been colonized with a biofilm formed by a microbial culture or a mixture of microorganisms with the capacity of binding metals by biosorption in which said at least of two bioreactors are connected in such a way that allows a first reactor of said at least of two bioreactors to perform the removal of metals by biosorption of the solution from the pre-treatment, while, a second bioreactor of said at least of two bioreactors with a full biosorption capacity is kept or subjected to desorption and neutralization;

an acid mixer tank connected to each of said bioreactors to add the acid as a desorption agent, and a base mixer tank connected to each one of said bioreactors to add a base solution that allows the residual acid neutralization after the desorption.

In another preferred embodiment of this invention, the plant for the removal of metals comprehends:

a group of bioreactors, constituted by at least three fixed bed bioreactors, which packing material has been colonized with a biofilm formed by a microbial culture or a mixture of microorganisms with the capacity of binding metals by biosorption in which said at least three bioreactors are connected in a way that allows the connection in series of two of them to perform the removal of metals by biosorption of the solution from the pre-treatment; meanwhile, a third bioreactor of said at least of three bioreactors with a full biosorption capacity is kept or is subjected to desorption and neutralization;

an acid mixer tank connected to each of said bioreactors to add the acid as a desorption agent; and a base mixer tank connected to each one of said bioreactors to add a base solution that allows the residual acid to be neutralized after desorption.

In other preferred embodiment of this invention, the plant for the removal of metals comprehends also:

a base storage tank connected to the base mixer tank; and an acid storage tank connected to the acid mixer tank.

In other preferred embodiment of this invention, each one of the bioreactors of the group of bioreactors is a fixed bed aerated column, fluidized bed reactor or trickling filter. In a foreseen version of the invention, the agitation in each one of the bioreactors of the group of bioreactors is performed by a recycling pump. In another foreseen version of the invention, the plant also comprehends a culture medium preparation tank connected to the group of bioreactors. In other foreseen version of the invention, the plant also comprehends a heat exchanger connected to the recycling of the culture medium that allows to keep the temperature within each one of the bioreactors of the group of bioreactors during the colonization with the biofilm of the fixed bed support stage. In a preferred embodiment, the heat exchanger employed to control the temperature in each one of the bioreactors of the group of bioreactors is a plate heat exchanger or a tube heat exchanger. In other preferred embodiment the plant comprehends also a medium to provide an adequate aeration of the culture, during the stage of colonization with the biofilm of the fixed bed support material within the group of bioreactors.

According to an alternative embodiment of this invention, the plant also comprehends an additional bioreactor located in a different place from the plant, in which is previously performed the fixed bed colonization by microorganisms to, subsequently, pack it in each one of the bioreactors of the group of biosorption bioreactors by the beginning of the functioning of the plant or to replace the microbial film when, after many biosorption, desorption and neutralization cycles, its metals removal capacity begins to diminish.

In a preferred embodiment of the invention the plant for the removal of metals has a precipitation by pH rising pre-treatment system that comprehends, at least:

a neutralization reactor with a stirrer;

a settling tank; and a feed tank (also called buffer tank)

In other preferred embodiment of the invention, the plant for the removal of metals presents a solvent extraction pre-treatment system that comprehends at least:

a first stirrer tank to mix the extractant and the diluent a first mixer-settler tank;

a second mixer-settler tank; and an acid mixer tank.

In an additional preferred embodiment of this invention, the water treatment plant for the metals removal has a solvent extraction on emulsified liquid membranes pre-treatment system that comprehends at least:

a stirrer tank to perform the solvent preparation;

a first stirrer tank to prepare the first emulsion;

a second stirrer tank to prepare the stripping solution; and a mixer-settler tank to separate the first raffinate emulsion.

According to an additional embodiment of this invention, the plant also comprehends a chitosan binding stage, between precipitation by pH rising and biosorption. In a particular application, the chitosan binding stage comprehends, at least, two adsorption columns filled with chitosan.

In a preferred particular embodiment of this invention, the plant for the metals removal can be built inside of a shipping-type mobile container, provided of inner walls, a ceiling and a thermically isolated floor and with a washable covering and with, at least, one door and one window and an air conditioning system to control the inner temperature in places with different weather conditions, which allows to transport it and evaluate the performance of said plant.

The following detailed description illustrates some concrete applications of the invention; however, it does not intend to restrain the frame nor the reaches of the present invention.

DETAILED DESCRIPTION OF THE PREFERRED EMBODIMENTS

Figure 1:
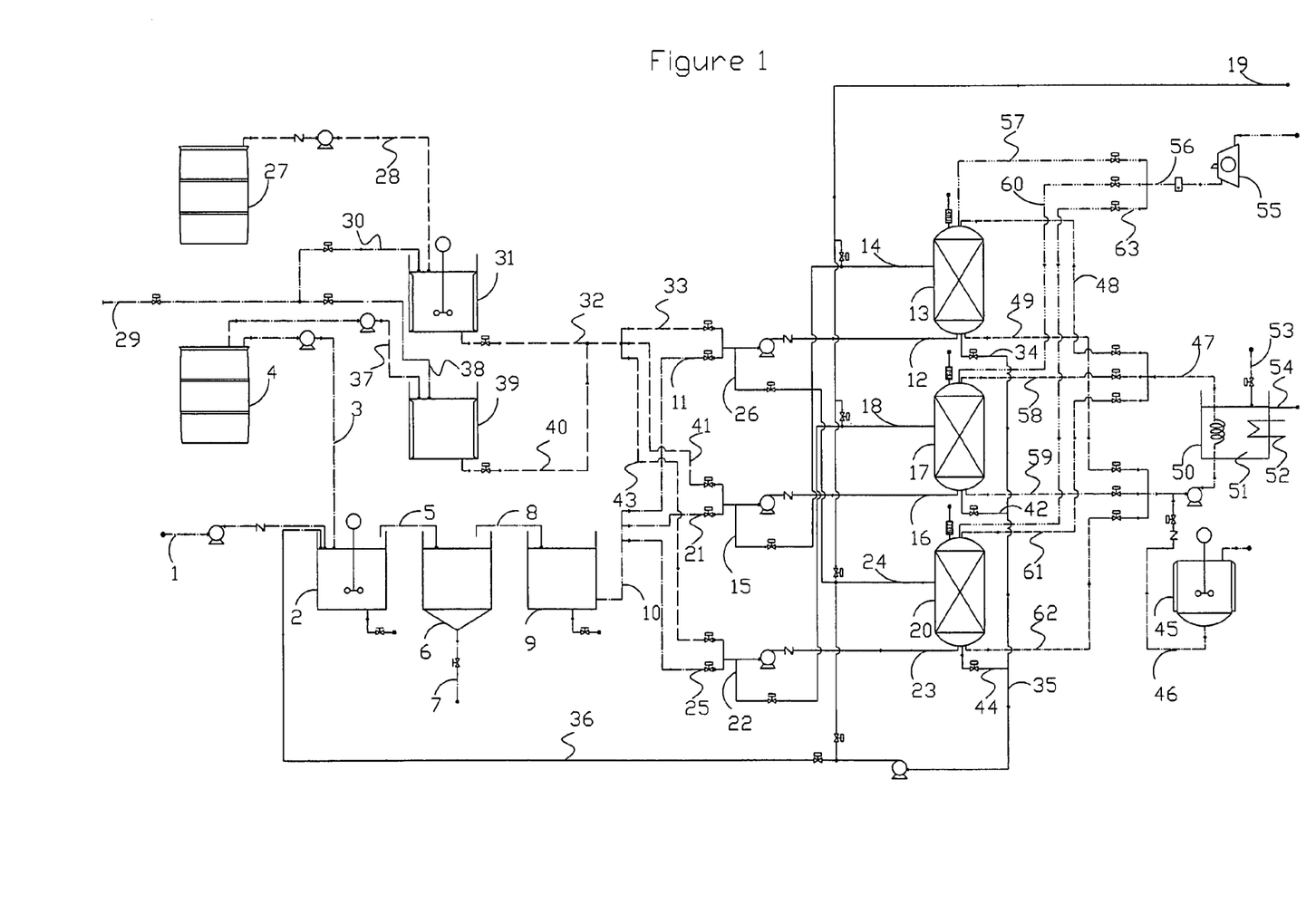
FIG. 1:
This Figure shows the flow sheet of a bioremediation process that employs a precipitation by pH rising pre-treatment stage.

FIG. 1 shows the flow sheet of a bioremediation process that employs a precipitation by pH rising pre-treatment stage.

The process consists of a treatment system for metal-polluted waters from the mining-metallurgic industry, by pre-treatment of the physical-chemical type and a biological treatment based on metals biosorption that, basically, consists of the metals removal by means of microorganisms.

The process begins with a pre-treatment stage. The liquid industrial waste from a mining company, a metallurgic activity and from an industrial activity, polluted with metals, is introduced by conduit 1 to a neutralization reactor 2, with stirrer, to which is added by conduit 3 a sodium hydroxide solution (e.g. NaOH 50%) stored in a tank 4, according to the requirements of the features of liquid industrial waste or mine drainage for their treatment. Once the liquid industrial waste has been neutralized, conduit 5 leads the liquid along with its precipitate to a settler tank 6 to accumulate the settling compounds that will be, subsequently, eliminated through conduit 7. The supernatant is fed by conduit 8 to a feed tank 9, also called buffer tank, and then, passed through conduit 10 to the stage where the biosorption process is developed.

The biosorption process consists of three stages called: culture, biosorption and desorption. The culture stage is necessary to form the microbial film in the fixed bed bioreactors, which present the metal removal by biosorption capability. The culture is needed not only for the initial formation of the microbial film, but also to replace the microbial film when its metals removal capacity begins to diminish, which is forward explained in detail.

Biosorption Stage

The biosorption stage refers to the removal of the metal ions in the liquid industrial waste or mine drainage from the pre-treatment stage through conduit 10. This stage is performed by using two fixed bed bioreactors in series with microbial films. The first bioreactor is employed to obtain a coarse metals removal and the second bioreactor allows an additional reduction of the metals concentration. Therefore, to obtain a continuous treatment system of the continuous type, at least three bioreactors are required. These bioreactors function, sequentially, according to three possible combinations (called forward case 1, case 2, and case 3).

In case 1, pre-treated water coming from conduit 10 is led by conduit 11 to conduit 12 to feed fixed bed bioreactor 13 with attached microorganisms, in which metals removal by biosorption to the attached microorganisms is produced. Water treated in bioreactor 13 is led by conduits 14, 15 and 16 to bioreactor 17, from which the treated effluent is obtained and led by conduit 18 to the discharge of the plant 19.

Case 2 occurs when bioreactor 13 gets saturated with metals. In this case, bioreactor 13 is taken away from the biosorption process and is replaced by bioreactor 17, that fills the place of the first bioreactor, while bioreactor 17 is replaced by bioreactor 20. For this purpose, pre-treated water from conduit 10 is led by conduit 21 to conduit 16 to feed fixed bed bioreactor 17 with attached microorganisms. Water treated in bioreactor 17 is led by conduits 18, 22 and 23 to bioreactor 20, from which treated effluent is obtained and led, by conduit 24, to the discharge of the plant 19.

Case 3 occurs when bioreactor 17 gets saturated with metals. In this case, bioreactor 17 is taken away from the biosorption process and is replaced by bioreactor 20, that fills the place of the first bioreactor, while bioreactor 20 is replaced by bioreactor 13. For this purpose, pre-treated water form conduit 10 is led by conduit 25 to conduit 23 to feed fixed bed bioreactor 20 with attached microorganisms. Water treated in bioreactor 20 is led by conduits 24, 26, and 12 to bioreactor 13, from which treated effluent is obtained and led, by conduit 14, to the discharge of the plant 19.

Once bioreactor 20 gets saturated with metals, case 1, already explained, starts again.

Desorption and Neutralization Stages

During the time bioreactor 13 is out of the biosorption process (case 2), it is subjected to the desorption stage that allows to elute the metal ions from the bioreactor and regenerate the metals binding capacity of the microorganisms attached to the support. This is performed by treating bioreactor 13 with an acid solution and, subsequently, with a base solution to neutralize the acid in the bioreactor. To prepare the acid solution, concentrated sulfuric acid (e.g. $H_2SO_4$ 95-97%) stored in tank 27, is led by conduit 28 along with water with low metals concentration (or treated by this process) that enters to the plant by the feeding conduit 29 and is led by conduit 30 to an acid mixer tank 31. The acid mixed solution is transported by conduits 32, 33 and 12 to bioreactor 13. The solution loaded with metals is taken away, after the desorption stage, from bioreactor 13 by conduits 34, 35 and 36 and is incorporated in neutralization reactor 2. Once desorption is finished, the pH in bioreactor 13 is neutralized by using a base solution. To prepare the base solution, a concentrated sodium hydroxide solution (e.g. NaOH 50%) stored in tank 4 is led by conduit 37 and mixed with the low metals concentrated water (or treated by this process) from conduit 29. This mixture is led by conduit 38 to a sodium hydroxide mixer tank 39. The mixed base solution is transported by conduits 40, 33 and 12 to bioreactor 13. The neutralizing solution is taken away from bioreactor 13 by conduits 34 and 35 and is discharged at the exit of the plant by conduit 19.

During the time bioreactor 17 is out of the biosorption process (case 3), it is subjected to the desorption stage, that allows the adsorbed metal ions to be eluted from the bioreactor and regenerate the metals binding capacity of the microorganisms attached to the support. This is performed by treating bioreactor 17 with an acid solution and, subsequently, with a base solution to neutralize the acid in the bioreactor. For this purpose, an acid solution is led to bioreactor 17. To prepare the acid solution, concentrated sulfuric acid (e.g. $H_2SO_4$ 95-97%) stored in tank 27 is led by conduit 28 along with low metals concentrated water (or treated by this process) that flows into the plant by the feeding conduit 29 and is led by conduit 30 to an acid mixer tank 31. The acid mixed solution is transported by conduits 32, 41 and 16 to bioreactor 17. The solution loaded with metals, after the desorption stage is taken away from bioreactor 17 by conduits 42, 35 and 36 and is incorporated in the neutralizing reactor 2. Once the desorption is finished, the pH in bioreactor 17 is neutralized by using a base solution. To prepare the base solution, a concentrated sodium hydroxide solution (e.g. NaOH 50%) stored in tank 4 is led by conduit 37 and is mixed with low metals concentrated water (or treated by this process) from conduit 29. This mixture is led by conduit 38 to a sodium hydroxide mixer tank 39. The mixed base solution is transported by conduits 40, 41 and 16 to bioreactor 17. The neutralizing solution is taken away from bioreactor 17 by conduits 42 and 35 and is discharged at the exit of the plant by conduit 19.

During the time bioreactor 20 is out of the biosorption process (case 1), it is subjected to the desorption stage, that allows adsorbed metal ions to be eluted from the bioreactor and regenerate the metals binding capacity of the microorganisms attached to the support. This is performed by treating bioreactor 20 with an acid solution and, subsequently, with a base solution to neutralize the acid in the bioreactor. For this purpose, an acid solution is led to bioreactor 20. To prepare the acid solution, concentrated sulfuric acid (e.g. $H_2SO_4$ 95-97%) stored in tank 27 is led by conduit 28 and water with low metals concentration (or treated by this process) entering to the plant by the feeding conduit 29 and is led, by conduit 30, to an acid mixer tank 31. The acid mixed solution is transported by conduits 32, 43 and 23 to bioreactor 20. The solution loaded with metals, after the desorption stage, is taken away from bioreactor 20 by conduits 44, 35 and 36 and is incorporated in the neutralizing reactor 2. Once the desorption is finished, the pH in bioreactor 20 is neutralized by using a base solution. To prepare the base solution, a concentrated sodium hydroxide solution (e.g. NaOH 50%) stored in tank 4 is led by conduit 37 and is mixed with low metals concentrated water (or treated by this process) from conduit 29. This mixture is led by conduit 38 to a sodium hydroxide mixer tank 39. The mixed base solution is transported by conduits 40, 43 and 23 to bioreactor 20. The neutralizing solution is taken away from bioreactor 20 by conduits 44 and 35 and is discharged at the exit of the plant by conduit 19.

Culture Stage of the Attached Microorganisms on the Fixed Bed of Bioreactors

Biosorption occurs in bioreactors 13, 17 and 20 by the action of microorganisms attached to the support or fixed bed. Therefore, when starting the functioning of the treatment method, colonization of the fixed bed or support by microorganisms with the capacity of binding metals (such as microorganisms of the type of *Bacillus, Pseudomonas, Klebsiella, Enterobacter* or mixtures of microorganisms that form biofilms isolated from the natural environments). Thus, the microbial biofilm must be replaced once its metals removal capacity, after many biosorption, desorption and neutralization cycles, begins to diminish. In this last case, the fixed bed recolonization is performed in the bioreactor that has already finished the biosorption and neutralization phase.

The attaching microorganisms culture in bioreactor 13 begins by preparing the culture medium containing all the nutrients for the growing of the attaching microorganism in the culture medium preparation tank 45. The recently prepared culture medium is inoculated with the attaching microorganism and led to bioreactor 13 by conduits 46, 47 and 48. Then, the inoculated culture medium is subjected to recycling by conduits 49, 47 and 48. During the recycling, the liquid is passed through by means of a heat exchange system 50 that works by a water bath 51, that permits to keep the temperature stable inside of the bioreactor with the purpose of achieving the optimal conditions for the growing and formation of the microbial biofilm of the attaching microorganism (e.g. 28° C.). This heat exchange system includes a heater 52 to raise the temperature at the beginning of the culture and a cooling by circulating water (to dissipate the heat produced by the growing of the microorganism) that flows into the heat exchange system 50 by conduit 53 and is taken away from it by conduit 54. To oxygenate the culture during its growing, air is led from the air compressor 55 by conduits 56 and 57 to bioreactor 13. A high oxygen transference is achieved by synchronizing the recycling of the culture medium that enters to the bioreactor by conduit 48 and the air entering by conduit 57 by means of the application of an air injector that is immersed in the liquid column and above the support material of the fixed bed bioreactor. The culture with medium recycling, aeration and temperature control is kept until the support material is colonized by the attaching microorganism (e.g. 8 to 20 hours of culture). Once the culture is finished, the exhausted culture medium of bioreactor 13 is taken away by conduits 34 and 35 and is discharged at the exit of the plant by conduit 19. Bioreactor 13 is left to stand for 24 hours, after that it is ready to start a biosorption, desorption and neutralization cycle.

Thus, the attaching microorganisms culture in bioreactor 17 starts by preparing the culture medium in the preparation of culture medium tank 45. The recently prepared culture medium is inoculated with the attaching microorganism and is led to bioreactor 17 by conduits 46, 47 and 58. After that, the inoculated culture medium is subjected to recycling by conduits 59, 47 and 58. During recycling, the liquid is passed through a heat exchange system 50. To oxygenate the culture during its growing, air is led from the air compressor 55 by conduits 56 and 60 to bioreactor 17. A high oxygen transference is achieved by synchronizing the recycling of the culture medium that enters to the bioreactor by conduit 58 and the air entering by conduit 60 by means of the application of an air injector that is immersed in the liquid column and above the support material of the fixed bed bioreactor. The culture with recycling of the culture medium, aeration and temperature control is kept until the support material is colonized by the attaching microorganism (e.g. 8 a 20 hours of culture). Once the culture is finished, the exhausted culture medium in bioreactor 17 is taken away by conduits 42 and 35 and discharged at the exit of the plant by conduit 19. Bioreactor 17 is left to stand for 24 hours, after that it is ready to begin a biosorption, desorption and neutralization cycle.

The attaching microorganisms culture in bioreactor 20 starts by preparing the culture medium in the culture medium preparation tank 45. The recently prepared culture medium is inoculated with the attaching microorganism and led to bioreactor 20 by conduits 46, 47 and 61. After that, the inoculated culture medium is subjected to recycling by conduits 62, 47 and 61. During recycling, the liquid is passed through a heat exchange system 50. To oxygenate the culture during its growing air is led from the air compressor 55 by conduits 56 and 63 to bioreactor 20. A high oxygen transference is achieved by synchronizing the culture medium recycling that enters to the bioreactor by conduit 61 and the air entering by conduit 63 by means of the application of an air injector immersed in the liquid column and above the support material of the fixed bed bioreactor. The culture with recycling of culture medium, aeration and temperature control is kept until the support material is colonized by attaching microorganisms (e.g. 8 to 20 hours of culture.) Once the culture is finished, the exhausted culture medium in bioreactor 20 is taken away by conduits 44 and 35 and discharged at the exit of the plant by conduit 19. Bioreactor 20 is left to stand for 24 hours, after that it is ready to start a biosorption, desorption and neutralization cycle.

Figure 2:
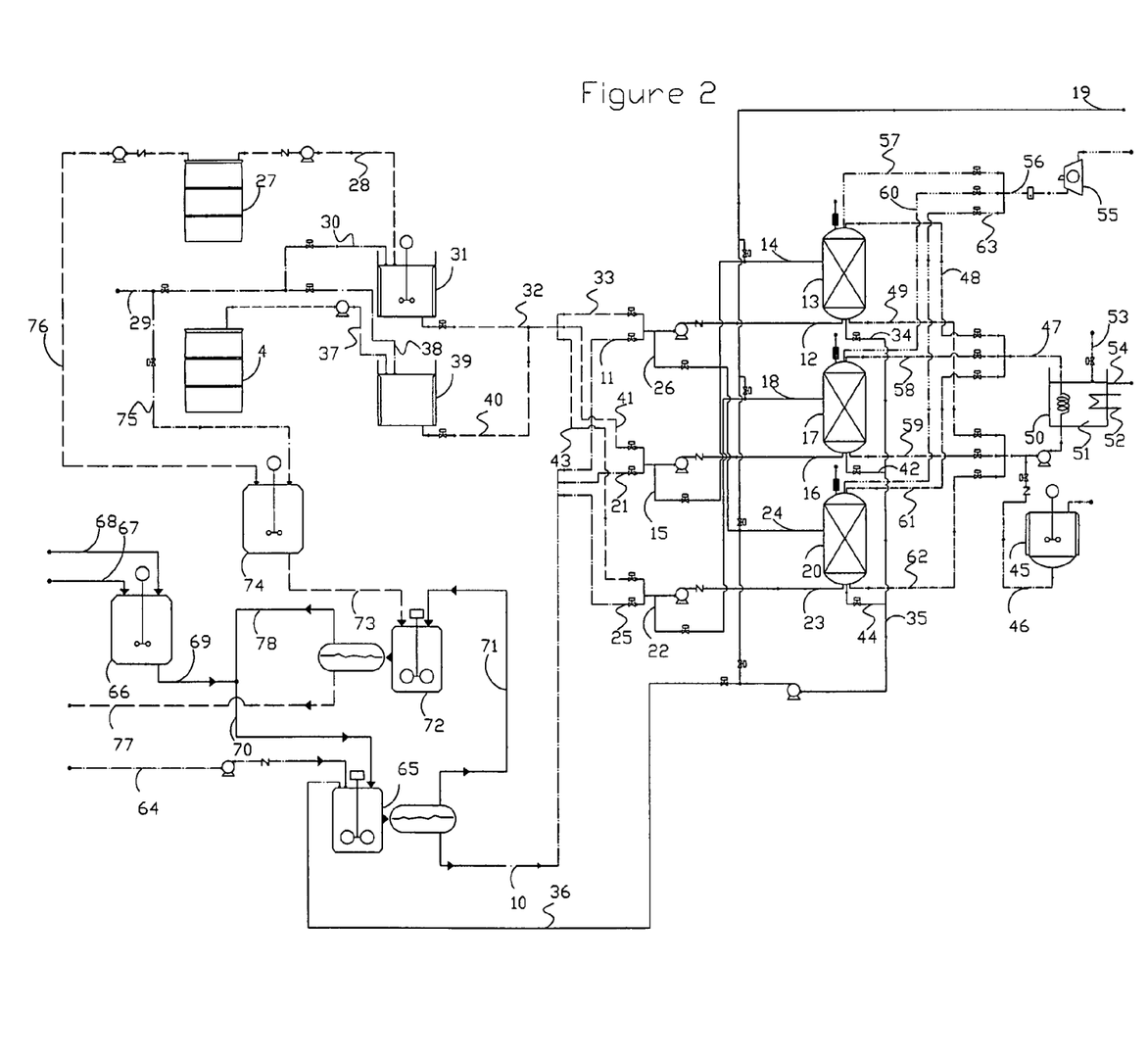
FIG. 2:
This Figure shows the flow sheet of a bioremediation process that employs a solvent extraction pre-treatment stage.

FIG. 2 shows a flow sheet of a bioremediation process that employs a pre-treatment by solvent extraction stage.

The liquid industrial waste of a mining company, a metallurgic activity, or an industrial activity, contaminated with metals, is introduced by conduit 64 into a mixer-settler extraction tank 65 where it is contacted with an organic type liquid phase called "solvent" prepared in reactor 66. To said reactor enter, by conduit 67, an acid extractant compound (e.g. 5-dodecylsalicylaldoxime, 2-ethylhexylphosphonic acid-mono-2-ethyl hexyl ester) and a diluent substance (e.g. aviation Kerosene, n-heptane, n-hexane) by conduit 68. These substances are mixed in different proportions. This solvent is transported to the mixer-settler tank 65 by conduits 69 and 70. The mixer-settler tank consists of a mixing by mechanic agitation area, followed by a settling area where the phases separation occurs. The liquid industrial waste o mine drainage and the solvent mix are agitated properly in the mixing area (e.g. 120 rpm) of the mixer-settler tank 65 and then, by overflowing, it is led to the settling area, where a raffinate solution corresponding to an aqueous solution with low concentration of metals and an organic solution loaded with metals are obtained. The raffinate solution enters directly to the final process of biosorption by conduit 10 (above explained), while the organic solution containing the metals is transported by conduit 71 to a second mixer-settler stripping tank 72. In the mixer-settler tank 72, the organic solution loaded with metals is contacted with a hard acid solution (stripping solution) added by conduit 73 and from the acid mixer tank 74 in which concentrated sulfuric acid and the water with low metals content (or treated by this process) from conduits 29 and 75 are mixed. The concentrated sulfuric acid is kept in tank 27 and transported by conduit 76 to the mixing tank 74. In the mixing area of the mixer-settler tank 72 by mechanic agitation (e.g. 120 rpm) the organic phase containing the metals is mixed with the acid sulfuric solution, and then, the mixture is passed through overflowing to the settling area. As a result of this contact, it is obtained, on one hand, an aqueous phase less acid where metals are concentrated; this phase is called "strip liquor" and comes out from the plant by conduit 77 to an possible subsequent process of metals recovery and purification. On the other hand, from the mixer-settler tank 72 the organic phase is regenerated and recycled to tank 65 by conduits 78 and 70.

The solution loaded with metals, from the desorption stage of the bioreactors is incorporated by conduit 36 to the same level as conduit 64 of entrance to the process for the liquid industrial waste.

Figure 3:
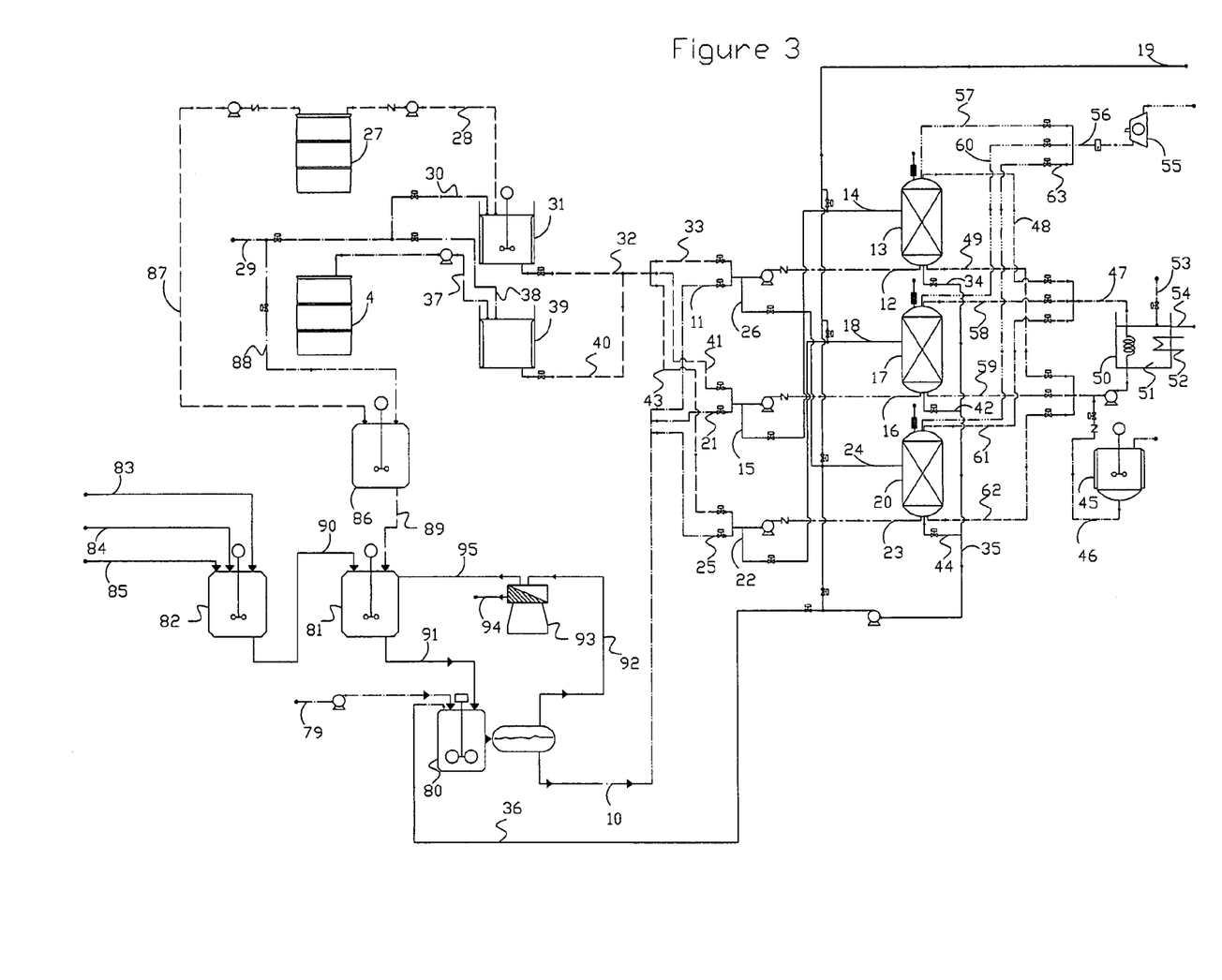
FIG. 3:
This Figure shows the flow sheet of a bioremediation process that employs a solvent extraction on emulsified liquid membranes pre-treatment stage.

FIG. 3 shows the flow sheet of a bioremediation process that employs a pre-treatment by solvent extraction stage on emulsified liquid membranes.

In tank 81 is performed the preparation of the primary emulsion, by agitating energetically (e.g. 1200 rpm) the stripping solution prepared in reactor 86 and transported by conduit 89, with the organic phase prepared in reactor 82 and transported by conduit 90. The organic phase is compounded by an extractant (e.g. 5-dodecylsalicylaldoxime or 2-ethylhexylphosphonic acid-mono-2-ethylhexyl ester) and a surfactant or tensoactive compound (e.g. sorbitan monooleate) dissolved in a diluent (e.g. aviation kerosene, n-hexane, n-heptane) led to reactor 82 by conduits 83, 84 and 85, respectively. The stripping solution is prepared in reactor 86 by mixing concentrated sulfuric acid, stored in tank 27, added by conduit 87 and water with low metal concentration (or treated by this process) transported to reactor 86 by conduits 29 and 88.

The liquid industrial waste of a mining company, a metallurgic activity, or an industrial activity, contaminated with metals, is introduced by conduit 79 into a mixer-settler extraction tank 80 where it is contacted with the primary emulsion, introduced by conduit 91, performing a mild agitation (e.g. 200 rpm) in the mixing area where a double emulsion of the type water/oil/water is produced. After the contact of the double emulsion in the mixing area of the mixer-settler tank 80, the mixture is transported by overflowing to the settling area of reactor 80, where the first emulsion loaded with metals is separated from the raffinate solution, which is passed to the biosorption stage (above explained) by conduit 10. On the other hand, primary emulsion containing metals is led by conduit 92 to reactor 93 to proceed to its breakdown (e.g. by centrifugation, by heating or, by electric potential). From this breakdown of the primary emulsion is finally obtained the strip liquor that comes out from the plant by conduit 94 to a subsequent possible process of recovering and purification of metals and an organic solution that is recycled to tank 81 by conduit 95 for a new preparation of the primary emulsion. The solution loaded with metals, coming from the bioreactors desorption stage is incorporated by conduit 36 to the same level as the conduit 79 of entrance to the process for the liquid industrial waste.

Figure 4:
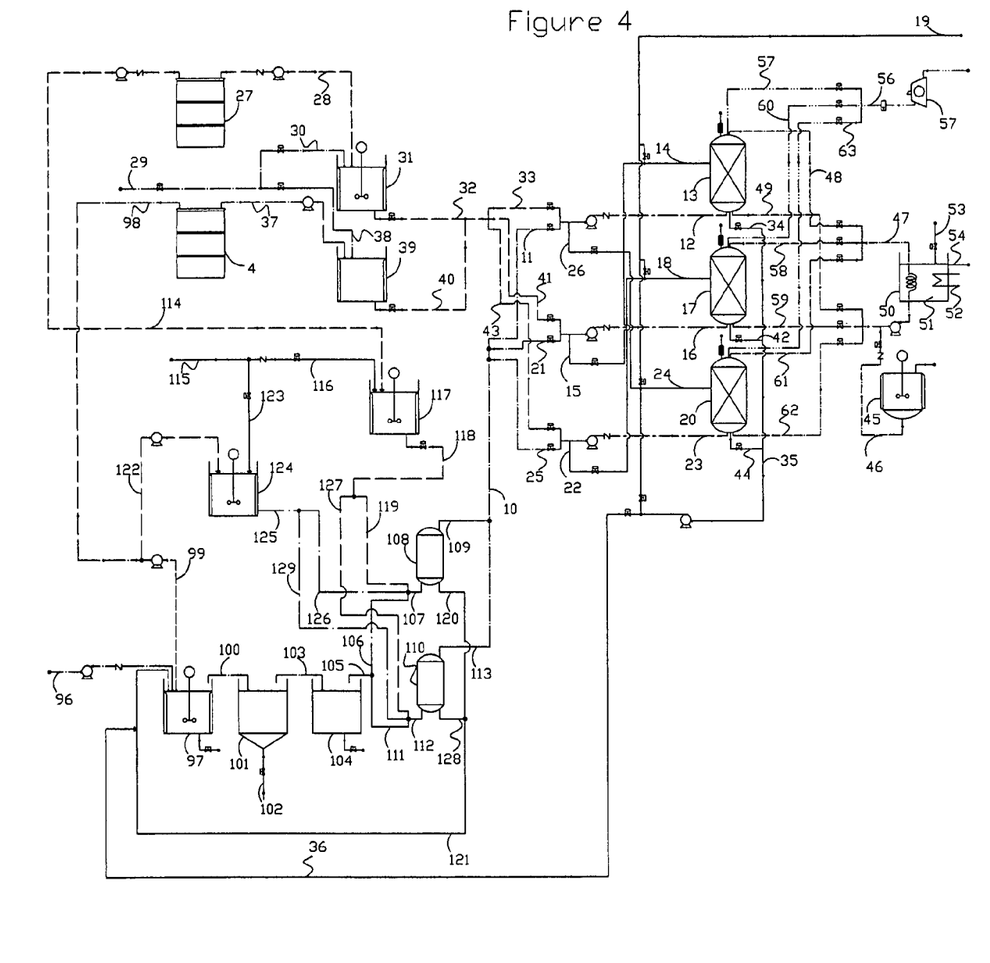
FIG. 4:
This Figure shows the flow sheet of a bioremediation process that employs a precipitation by pH rising and adsorption on chitosan pre-treatment stage.

FIG. 4 shows the flow sheet of a bioremediation process that employs a combined pre-treatment stage of precipitation by pH rising and adsorption on chitosan.

The preliminary stage starts by flowing the liquid industrial waste from a mining activity, a metallurgic activity or an industrial activity, polluted with metals, by conduit 96 into a stirred mixer tank 97 to which is added by conduits 98 and 99 a NaOH solution (e.g. NaOH 50%), stored inside of tank 4 with the purpose of keeping the pH inside of tank 97 in a value higher or equal to 3, when necessary (pH<3). Once neutralized the liquid industrial waste, conduit 100 passes the liquid with its precipitate to a settler tank 101 to accumulate the settling compounds, subsequently eliminated by conduit 102. The supernatant is fed by conduit 103 to a feed tank 104, to pass then by conduit 105 to the columns of chitosan adsorption, a natural polymer extracted as chitin from the shells of many different animals (e.g.

prawns, crustaceans, insects) and subsequently modified into chitosan by chemical reaction of deacetylation. These columns work in a regime constituted by two stages called adsorption and desorption. The adsorption stage corresponds to the removal of the metal ions in the flow from conduit 105, by a physical-chemical process of adsorption of these ions with chitosan. The desorption stage allows the adsorbed metal ions to be eluted from the columns to regenerate the metal binding capacity of the chitosan by means of a concentrated mineral acids treatment (e.g. sulfuric acid, nitric acid or hydrochloric acid) followed by an alkalinization of the polymer by sodium hydroxide to eliminate the excess of acidity possibly retained by the polymer during the desorption stage. While a column is in the adsorption stage, the other one is in the desorption stage and vice versa.

In the first case, the water from conduit 105 is led by conduit 106 to conduit 107 to feed column 108 packed with chitosan in which the partial removal of metals is produced. The water treated in column 108 is led by conduits 109 and 110 to the biosorption stage. The second case occurs when the saturation with metals of column 108 is produced. In this situation, column 108 is taken away from the adsorption process and replaced by column 110. For this purpose, the water from conduit 105 is led by conduit 111 to conduit 112 to feed column 110 packed with chitosan. The pre-treated water in column 110 is led by conduits 113 and 10 to the biosorption stage (above explained).

While column 108 is out of the adsorption process (second case) it is subjected to the desorption stage. This is performed by treating column 108 with an acid solution and, subsequently, with a base solution to neutralize the acid in the column. To prepare the acid solution, concentrated sulfuric acid (e.g. $H_2SO_4$ 95-97%) stored in tank 27, is led by conduit 114 along with drinking water entering by the feeding conduit 115 and led by conduit 116 to an acid mixer tank 117. The acid mixed solution is transported by conduits 118, 119 and 107 to column 108. The solution loaded with metals, after the desorption stage is taken away from column 108 by conduits 120 and 121 and is incorporated in the neutralization reactor 97. Once the desorption is finished the pH in column 108 is neutralized by a base solution. To prepare said base solution, a concentrated NaOH solution (e.g. NaOH 50%) is stored in tank 4, led by conduits 98 and 122, and mixed with drinking water coming form conduits 115 and 123 in the mixer tank 124. The base solution obtained is transported by conduits 125, 126 and 107 to column 108. The neutralization solution is taken away from column 108 by conduits 109 and 110.

While column 110 is out of the adsorption process (first case) it is subjected to the desorption stage. This is performed by treating column 110 with an acid solution and, subsequently, with a base solution to neutralize the acid in the column. To prepare the acid solution, concentrated sulfuric acid (e.g. $H_2SO_4$ 95-97%) stored in tank 27, is led by conduit 114 along with drinking water entering by the feeding conduit 115 and led by conduit 116 to an acid mixer tank 117. The acid mixed solution is transported by conduits 118, 127 and 112 to column 110. The solution loaded with metals, after the desorption stage is taken away from column 110 by conduits 128 and 121 and is incorporated in the neutralization reactor 97. Once the desorption is finished the pH in column 110 is neutralized by a base solution. To prepare said base solution, a concentrated NaOH solution (e.g. NaOH 50%) is stored in tank 4 is led by conduits 98 and 122 and mixed with drinking water coming form conduits 115 and 123 in the mixer tank 124. The base solution obtained is transported by conduits 125, 129 and 112 to column 110. The neutralization solution is taken away from column 110 by conduits 113 and 10.

The solution loaded with metals coming from the bioreactors desorption stage is incorporated by conduit 36 by conduit 96 of entrance to the process for the liquid industrial waste.

As an example, a semi pilot plant is built to perform tests in place of the bioremediation process of water useful to biologically remove heavy metals using attached microorganisms, designed for the continuous treatment of a 1 $m^3$/day flow rate. This semi pilot plant, according to the flow sheet explained in FIG. 1, is installed inside of a 2.5×6.0 metres container, which is provided of internal walls, ceiling and a thermically isolated floor with a washable covering. The frontal wall of the container has one door and two windows. In a lateral wall an air conditioning system is installed in order to control the inner temperature in places with different weather conditions. This allows to transport and evaluate the plant in the place where liquid residues are generated in mining and manufactory companies. This allows to make decisions about special pre-treatments, depending on the contamination level of each company, and make escalation projections for an industrial type of plant. The semi pilot plant is provided of the following reactors and bioreactors, according to the flow sheet in FIG. 1:
    neutralization reactor with stirrer (250 litres)
    settling tank (250 litres)
    feed tank (also called buffer tank) (250 litres)
    base mixer tank with stirrer (100 litres)
    acid mixer tank (250 litres)
    culture medium preparation tank with stirrer (250 litres)
    three fixed bed bioreactors with metals removal by biosorption capability (100 litres each)
    heat exchange system The four pumps are installed for the conveyance of the liquid industrial waste or mine drainage to be treated at the different stages of the process, the culture medium recycling pump for the three bioreactors, the dosing pump for NaOH and $H_2SO_4$, the hand-operated and solenoid valves, an air compressor and the piping and conduits, according to the flow sheet in FIG. 1. Thus, electrical connections and automatization and monitoring system SNAP I/O of Opto22 of the processes involved in the bioremediation plant are installed.

In an external ware house the following reagent vessels are located:
    NaOH (50 litres) storage tank
    $H_2SO_4$ tank (50 litres) storage tank The following numerical values, which should not be considered as restrictions, are quoted in order to provide an example of the results obtained when applying the semi pilot plant to different mining effluents that present low pH values and high contents of dissolved metals:

For an affluent from a mining company and introduced to the plant through conduit 1:
pH=1.5–4.0
$Cu^{2+}$=20–300 mg/L
$Fe^{3+}$=1–320 mg/L
$Zn^{2+}$=6–80 mg/L For a treated effluent, that is led to the discharge of the plant 19:
pH=6.0–6.5
$Cu^{2+}$=<1 mg/L
$Fe^{3+}$=<5 mg/L
$Zn^{2+}$=<3 mg/L As an additional example of the application of this invention, a treatment plant for effluents with high metals concentration and low pH is described. Said plant is designed for the continuous treatment of a 50 m3/day flow rate. The plant is provided of the following reactors and bioreactors, according to the flow sheet in FIG. 1:

neutralization reactor with stirrer (300 m³)
settling tank (300 m³)
feed tank (also called buffer tank) (300 m³)
base mixer tank with stirrer (120 m³)
acid mixer tank (120 m³)
culture medium preparation tank with stirrer (120 m³)
three fixed bed bioreactors with the metals removal by biosorption capacity (120 m³ each)
heat exchange system The four pumps are installed for the conveyance of the liquid industrial waste or mine drainage to be treated at the different stages of the process, the culture medium recycling pump for the three bioreactors, the dosing pump for NaOH and $H_2SO_4$, the hand-operated and solenoid valves, an air compressor and the piping and conduits, according to the flow sheet in FIG. 1. Thus, electrical connections and an automation and monitoring system SNAP I/O of Opto22 of the processes involved in the bioremediation plant are installed.

Also, the following reagent vessels are built:
NaOH (60 m³) storage tank
$H_2SO_4$ (60 m³) storage tank

The invention claimed is:

1. A method for the removal of metals by biosorption from mining or industrial effluents which comprises:
   (a) subjecting the effluent to, at least, one first stage of pre-treatment, selecting among: precipitation by pH rising, solvent extraction or solvent extraction on emulsified liquid membranes to reduce its load of metals to concentrations that can be treated in the next stage of biosorption; and
   (b) subjecting the liquid that has been previously treated at the pre-treatment stage to a second stage of continuous removal of metals by biosorption, in which microbial biomass is grown and immobilized in a bioreactor, towards which the water to be treated is led and, finally, the metal ions uptaken by the biomass are eluted.

2. A method for the removal of metals in accordance with claim 1, wherein said continuous metals removal by biosorption stage comprises the steps of:
   (b1) providing of at least two fixed bed bioreactors, which packing material can be colonized with a biofilm formed by a microbial culture or a mixture of microorganisms with the metal binding by biosorption capability;
   (b2) always perform the colonization of the packing material of said at least two bioreactors using microorganisms when starting the functioning of the treatment method, said colonization is performed by adding culture medium to said at least two bioreactors, inoculating them with the attaching microorganism and subjecting the culture to aeration, agitation and temperature control for a suitable period of time to obtain the effective colonization of the support material of said at least two bioreactors, once the culture is finished, the culture medium is taken away and said at least two bioreactors are ready to be employed in the biosorption stage;
   (b3) leading the pre-treated water to a first bioreactor of one of said at least two bioreactors from which one the treated effluent is obtained and led to the discharge of the plant; meanwhile, a second bioreactor from one of said at least two bioreactors that presents full biosorption capacity, is kept;
   (b4) when the biosorption capacity of said first bioreactor gets saturated, lead the pre-treated water to said second bioreactor that was kept, now from this last one the treated effluent is obtained and lead to the discharge of the plant;
   (b5) subjecting said first bioreactor, meanwhile and simultaneously, to a treatment of desorption and neutralization, to regenerate the biosorption capacity of the biofilm attached to the support material of said first bioreactor, said desorption is performed by adding a solution with a desorbent agent, just like an acid solution, that can displace the metals bound to the microorganisms, obtaining an acid solution loaded with metal ions, which is reused in a new process of desorption or is lead to the beginning of the process, mixing it with the effluent entering to the pre-treatment;
   (b6) performing, finally, the neutralization of said first bioreactor, adding a base solution that allows to set the pH value close to the neutral point, in order to improve the biosorption capacity; and
   (b7) repeating from the previous stage b4, performing a rotation of said at least two bioreactors when that one of said at least two bioreactors that receives the pre-treated effluent gets saturated again, and where said that one of said at least two bioreactors can be said first bioreactor or said second bioreactor; and
   (b8) performing the recolonization of the fixed bed using microorganisms to replace the microbial film when, after many biosorption, desorption and neutralization cycles, its metal removing capacity begins to diminish, in this case, the recolonization of the fixed bed is performed in said first or second bioreactor that has finished the biosorption and neutralization phase, where said colonization is produced by adding culture medium to said first or second bioreactor, inoculating it with the attaching microorganism and subjecting the culture to aeration, agitation and temperature control for a suitable period of time to obtain an effective colonization of the support material of said first or second bioreactor, once the culture is finished, the culture medium is taken away and said first or second bioreactor is ready to be used again in the biosorption stage.

3. A method for the removal of metals in accordance with claim 1, wherein said continuous metal removing by biosorption stage comprises the steps of:
   (b1) providing of at least three fixed bed bioreactors, which packing material can be colonized with a biofilm formed by a microbial culture or a mixture of microorganism with the capability of binding metals by biosorption;
   (b2) always perform the colonization of the packing material of said at least three bioreactors using microorganisms when starting the functioning of the treatment method, said colonization is produced by adding culture medium to said at least three bioreactors, inoculating them with the attaching microorganism and subjecting the culture to aeration, agitation and temperature control for a suitable period of time to obtain the effective colonization of the support material of said at least three bioreactors, once the culture is finished, the culture medium is taken away and said at least three bioreactors are ready to be used in the biosorption stage;

(b3) leading the pre-treated water to a first bioreactor of said at least three bioreactors and from this one to a second bioreactor of said at least three bioreactors, connected in series, from this last one the treated effluent is obtained, and led to the discharge of the plant; meanwhile, a third bioreactor of said at least three bioreactors, that presents a full biosorption capacity, is kept;

(b4) leading the pre-treated water to said second bioreactor when the biosorption capacity of said first bioreactor gets saturated and from this one to said third bioreactor, connected in series, that was kept, now from this last one is obtained the treated effluent that is led to the discharge of the plant;

(b5) subjecting said first bioreactor, meanwhile and simultaneously, to a desorption and neutralization treatment, in order to regenerate the biosorption capacity of the biofilm that is attached to the support material of said first bioreactor, said desorption is performed by adding a solution with a desorbent agent, just like an acid solution, that can displace the metals bound to the microorganisms, obtaining an acid solution loaded with metal ions, and which is reused in a new desorption process or is led to the beginning of the process, mixing it with the effluent entering to the pre-treatment;

(b6) performing, finally, the neutralization of said first bioreactor, adding a base solution to set the pH value close to the neutral point in order to improve its biosorption capacity;

(b7) repeating from previous stage b4 performing a rotation of the bioreactors when that one reactor, from said at least three bioreactors that receives the pre-treated effluent, gets saturated again, where that one bioreactor of said at least three bioreactors can be said first, second or third bioreactor; and (b8) performing the recolonization of the fixed bed by microorganisms to replace the microbial film when, after many biosorption, desorption and neutralization cycles, its metal removing capacity begins to diminish; in this case, the recolonization of the fixed bed is performed in the same bioreactor that has finished the biosorption and neutralization stage; said colonization is performed by adding culture medium to said bioreactor; the said colonization is performed by adding culture medium to said bioreactor, inoculating it with the attaching microorganism and subjecting the culture to aeration, agitation and temperature control for a suitable period of time to obtain an effective colonization of the support material of said bioreactor, once the culture is finished the culture medium is taken away and said bioreactor is ready to be used again in the biosorption stage.

4. A method for the removal of metals in accordance with claim 2, wherein said microbial culture is a bacterial or archaeal culture.

5. A method for the removal of metals in accordance with claim 4, wherein said culture of bacteria contains a population of selected bacteria among the genus *Bacillus, Pseudomonas, Klebsiella* or *Enterobacter*.

6. A method for the removal of metals in accordance with claim 2, wherein said mixture of microorganisms is a community of natural microorganisms that form a biofilm isolated form the environment.

7. A method for the removal of metals in accordance with claim 2, wherein said bioreactor is a fixed bed aerated column.

8. A method for the removal of metals in accordance with claim 2, wherein said bioreactor is a fluidized bed reactor.

9. A method for the removal of metals in accordance with claim 2, wherein said bioreactor is a trickling filter.

10. A method for the removal of metals in accordance with claim 2, wherein said agitation is performed by recycling the culture medium with a pump.

11. A method for the removal of metals in accordance with claim 2, wherein said temperature control is performed by a temperature exchanger.

12. A method for the removal of metals in accordance with claim 2, wherein said desorbent agent can be: sulfuric acid, hydrochloric acid, phosphoric acid or citric acid.

13. A method for the removal of metals in accordance with claim 2, wherein said colonization of the fixed bed by microorganisms is performed alternately and previously in an additional bioreactor that is in a different place from the plant, to pack it in the biosorption bioreactor when starting the functioning of the treatment plant or to replace the microbial film when, after many biosorption, desorption and neutralization cycles, its metal removal capacity begins to diminish.

14. A method for the removal of metals in accordance with claim 3, wherein said microbial culture is a bacterial or archaeal culture.

15. A method for the removal of metals in accordance with claim 14, wherein said culture of bacteria contains a population of selected bacteria among the genus *Bacillus, Pseudomonas, Klebsiella* or *Enterobacter*.

16. A method for the removal of metals in accordance with claim 3, wherein said mixture of microorganisms is a community of natural microorganisms that form a biofilm isolated form the environment.

17. A method for the removal of metals in accordance with claim 3, wherein said bioreactor is a fixed bed aerated column.

18. A method for the removal of metals in accordance with claim 3, wherein said bioreactor is a fluidized bed reactor.

19. A method for the removal of metals in accordance with claim 3, wherein said bioreactor is a trickling filter.

20. A method for the removal of metals in accordance with claim 3, wherein said agitation is performed by recycling the culture medium with a pump.

21. A method for the removal of metals in accordance with claim 3, wherein said temperature control is performed by a temperature exchanger.

22. A method for the removal of metals in accordance with claim 3, wherein said desorbent agent can be: sulfuric acid, hydrochloric acid, phosphoric acid or citric acid.

23. A method for the removal of metals in accordance with claim 3, wherein said colonization of the fixed bed by microorganisms is performed alternately and previously in an additional bioreactor that is in a different place from the plant, to pack it in the biosorption bioreactor when starting the functioning of the treatment plant or to replace the microbial film when, after many biosorption, desorption and neutralization cycles, its metal removal capacity begins to diminish.

24. A method for the removal of metals in accordance with claim 1, wherein said first stage of precipitation by pH rising pre-treatment comprising the steps of:
 letting the effluent loaded with metals in a neutralization tank, with stirrer, to which a sodium hydroxide solution is added, according to the particular requirements of the industrial liquid waste to be treated;

once neutralized, leading the flow to a settling tank to accumulate the settling compounds to be eliminated subsequently;

leading the supernatant into a feed tank to pass it subsequently to the bioreactors, where the biosorption process is performed; and incorporating, at the beginning of the process, the solution loaded with metals from the subsequent stage of desorption of the bioreactors, at the neutralization reactor.

25. A method for the removal of metals in accordance with claim 24, wherein said settling compounds generated in this pre-treatment are subjected also to dewatering by a mechanical system, just like a press filter or a centrifuge.

26. A method for the removal of metals in accordance with claim 24, wherein said method also comprises, between precipitation by pH rising and biosorption, a chitosan binding stage.

27. A method for the removal of metals in accordance with claim 26, wherein said chitosan binding stage comprises the steps of:

providing of at least two columns filled with chitosan;

leading the pre-treated water with a pH higher than 3, essential for the process based on chitosan adsorption, to a first column of said at least two columns and from said first column the solution to be led to one of the bioreactors of biosorption is obtained; meanwhile a second column of said at least two columns, with a full adsorption capacity, is kept;

when the adsorption capacity of said first column gets saturated, the pre-treated water must be led to said second column of said at least two columns, that were kept, now from said second column the solution to be led to one of the biosorption bioreactors is obtained;

subjecting said first column, meanwhile and simultaneously, to a treatment of desorption and neutralization to regenerate the chitosan adsorption capacity, said desorption is performed by adding a solution with a desorbent agent, just as an acid solution, obtaining an acid solution loaded with metal ions, which is led to the beginning of the process, mixing it with the effluent entering to the pre-treatment;

performing, finally, the neutralization of said first column, adding a base solution to set the pH value close to the neutral point in order to improve its adsorption capacity; and repeating the previous procedure, performing a rotation of said at least two columns when that one of said at least two columns, that receives the pre-treated effluent, gets saturated again, in which said that one of said at least two columns can be said first column or said second column.

* * * * *